United States Patent
Chen et al.

(10) Patent No.: US 12,242,791 B2
(45) Date of Patent: Mar. 4, 2025

(54) SEMICONDUCTOR INTEGRATED CIRCUIT DESIGN METHOD AND APPARATUS

(71) Applicant: CHANGXIN MEMORY TECHNOLOGIES, INC., Hefei (CN)

(72) Inventors: Chuanjiang Chen, Hefei (CN); Kang Zhao, Hefei (CN); Li Bai, Hefei (CN); Li Tang, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 492 days.

(21) Appl. No.: 17/656,759

(22) Filed: Mar. 28, 2022

(65) Prior Publication Data
US 2023/0010293 A1 Jan. 12, 2023

Related U.S. Application Data

(63) Continuation of application No. PCT/CN2021/113537, filed on Aug. 19, 2021.

(30) Foreign Application Priority Data

Jul. 12, 2021 (CN) .......................... 202110783796.2

(51) Int. Cl.
*G06F 30/398* (2020.01)
*G06F 30/367* (2020.01)
(Continued)

(52) U.S. Cl.
CPC .......... *G06F 30/398* (2020.01); *G06F 30/367* (2020.01); *G06F 30/392* (2020.01); *G06F 2119/18* (2020.01)

(58) Field of Classification Search
CPC .... G06F 30/398; G06F 30/367; G06F 30/392; G06F 2119/18
(Continued)

(56) References Cited

U.S. PATENT DOCUMENTS 8,001,517 B2 * 8/2011 Kobayashi ............ G06F 30/392
716/139
8,863,064 B1 * 10/2014 Tien ........................ G06F 30/39
716/100
(Continued)

FOREIGN PATENT DOCUMENTS

CN          101866883 A        10/2010
CN          106876383 A         6/2017
(Continued)

OTHER PUBLICATIONS

Luo et al., Machine English Transation of Chinese Patent Document No. CN-10186683A, published on Oct. 20, 2009, machine translated by Escapacenet Patent Search at https://worldwide.espacenet.com, translated on Sep. 30, 2024, 12 pages. (Year: 2024).*
(Continued)

*Primary Examiner* — Phallaka Kik
(74) *Attorney, Agent, or Firm* — Syncoda LLC; Feng Ma

(57) ABSTRACT

A semiconductor integrated circuit design method and apparatus, and relates to the technical field of semiconductors are provided. The semiconductor integrated circuit design method includes: determining, based on an original layout, an original length of an end of a gate structure extending out of an active region in which the gate structure is located; redetermining, based on a preset rule and the original length, a correction length of the end of the gate structure extending out of the active region in which the gate structure is located; and integrating the original layout and the correction lengths, and forming an updated layout.

9 Claims, 16 Drawing Sheets

(51) Int. Cl.
*G06F 30/392* (2020.01)
*G06F 119/18* (2020.01)

(58) Field of Classification Search
USPC ............. 716/112, 53, 54, 55, 111, 122, 136; 703/14
See application file for complete search history.

(56) References Cited

U.S. PATENT DOCUMENTS

| | | | |
|---|---|---|---|
| 9,613,175 B2* | 4/2017 | Hensel | G06F 30/39 |
| 10,846,451 B1* | 11/2020 | Kolnik | G06F 30/367 |
| 12,106,031 B2* | 10/2024 | Chuang | G03F 1/36 |
| 2003/0162103 A1* | 8/2003 | Oshima | G03F 1/36 |
| | | | 430/296 |
| 2005/0274983 A1* | 12/2005 | Hayashi | G06F 30/392 |
| | | | 257/206 |
| 2008/0104550 A1* | 5/2008 | Sultan | G06F 30/392 |
| | | | 716/136 |
| 2009/0024968 A1* | 1/2009 | Yamada | G06F 30/39 |
| | | | 716/136 |
| 2009/0166746 A1* | 7/2009 | Mitani | H01L 21/823412 |
| | | | 257/E21.546 |
| 2009/0177448 A1* | 7/2009 | Chidambarrao | G06F 30/367 |
| | | | 703/2 |
| 2011/0124193 A1* | 5/2011 | Cheng | G06F 30/39 |
| | | | 700/121 |
| 2011/0140278 A1* | 6/2011 | Chen | G03F 1/36 |
| | | | 716/108 |
| 2013/0056799 A1* | 3/2013 | Ishizu | H01L 29/7848 |
| | | | 716/136 |
| 2015/0205901 A1* | 7/2015 | Kim | G06F 30/39 |
| | | | 716/55 |
| 2020/0004911 A1* | 1/2020 | Kim | G06F 30/367 |
| 2020/0065452 A1* | 2/2020 | Chuang | G06F 30/398 |
| 2020/0082032 A1* | 3/2020 | Hills | G06F 30/398 |
| 2020/0161196 A1* | 5/2020 | Hu | H01L 21/467 |
| 2022/0199408 A1* | 6/2022 | Lien | G06F 30/398 |
| 2024/0339461 A1* | 10/2024 | Peng | H01L 27/0688 |
| 2024/0386181 A1* | 11/2024 | Su | G06F 30/392 |

FOREIGN PATENT DOCUMENTS

| | | |
|---|---|---|
| CN | 104750894 B | 3/2018 |
| CN | 104809264 B | 8/2018 |
| CN | 112824972 A | 5/2021 |
| CN | 112928160 A | 6/2021 |

OTHER PUBLICATIONS

Fangce et al., Machine English Transation of Chinese Patent Document No. CN-112928160A, published on Jun. 8, 2021, machine translated by Escapacenet Patent Search at https://worldwide.espacenet.com, translated on Sep. 30, 2024, 14 pages. (Year: 2024).*

* cited by examiner

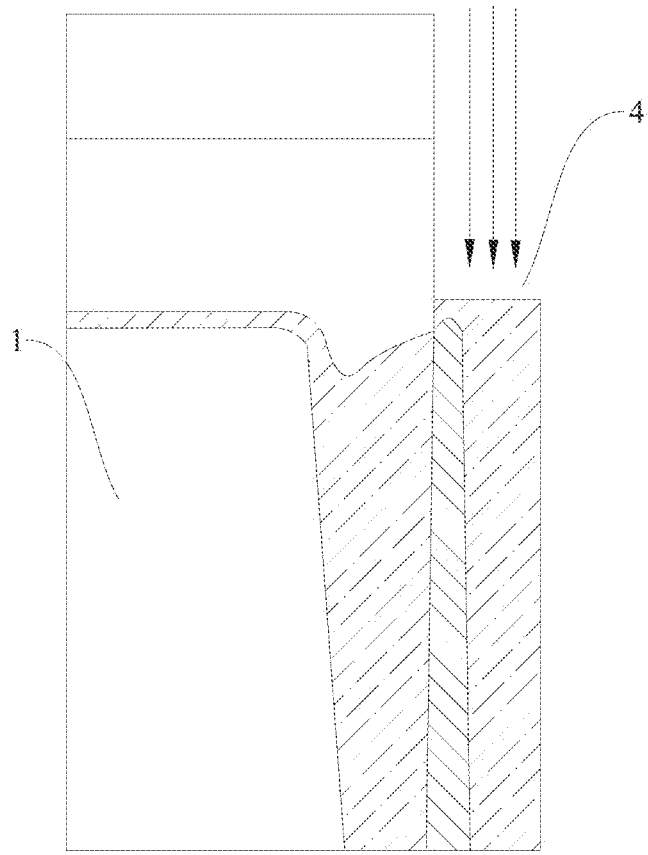

FIG. 3 (Prior Art)

```
┌─────────────────────────────────────────────────────────────┐
│ Determine, based on an original layout, an original length of an │──S100
│ end of a gate structure extending out of an active region in which │
│           the gate structure is located                     │
└─────────────────────────────────────────────────────────────┘
                              │
                              ▼
┌─────────────────────────────────────────────────────────────┐
│ Re-determine, based on a preset rule and the original length, a │──S110
│ correction length of the end of the gate structure extending out of │
│      the active region in which the gate structure is located │
└─────────────────────────────────────────────────────────────┘
                              │
                              ▼
┌─────────────────────────────────────────────────────────────┐
│ Integrate the original layout and the correction lengths, and form │──S120
│                      an updated layout                      │
└─────────────────────────────────────────────────────────────┘
```

FIG. 4

SEMICONDUCTOR INTEGRATED CIRCUIT DESIGN METHOD AND APPARATUS

CROSS-REFERENCE TO RELATED APPLICATIONS

This is a continuation of International Application No. PCT/CN2021/113537, filed on Aug. 19, 2021, which claims the priority to Chinese Patent Application 202110783796.2, titled "SEMICONDUCTOR INTEGRATED CIRCUIT DESIGN METHOD AND APPARATUS" and filed on Jul. 12, 2021. The entire contents of International Application No. PCT/CN2021/113537 and Chinese Patent Application 202110783796.2 are incorporated herein by reference.

TECHNICAL FIELD

The present disclosure relates to, but is not limited to a semiconductor integrated circuit design method and apparatus.

BACKGROUND

As the scale of integrated circuit is increasing, the number of transistors integrated on a single memory has reached several billions. It is difficult to ensure that no problem occurs during layout design of such a huge number of transistors. For example, when a length, of a gate structure 2 in a current channel of a transistor, extending out of an active region 1 is in sufficient, as shown in FIG. 1, the following problems are caused:

1) Since the upper and lower portions of the gate structure 2 of the transistor are similar to an arc 6 after optical proximity correction (OPC), if the length of the gate structure 2 extending out of the active region 1 is insufficient, the OPC result of the gate structure 2 of the transistor may fall into the edge of the active region 1 after actual design, as shown in FIG. 2. Consequently, an effective channel length 3 of the transistor at the intersection between the gate structure 2 and the active region 1 is insufficient, which reduces the device characteristics of the transistor.

2) In subsequent production, for example, when ions 4 are injected, they diffuse to sides of the active region 1. In this case, a conductive path may be formed on a sidewall of the active region 1 of the transistor, as shown in FIG. 3. As a result, transistor leakage occurs, resulting in excessive power consumption of the memory.

In order to resolve the problem of insufficient length of the gate structure 2 extending out of the active region 1 in layout design, the gate structure 2 needs to be stretched, but this means that positions of the existing wiring structure 5 connected to the transistor on the layout may also need to be changed, resulting in a large number of transistors on the layout needing to be moved. This will lead to completely waste of much pre-work, and the layout engineer has to spend a lot of time for layout correction or re-layout and rewiring.

SUMMARY

An overview of the subject matter detailed in the present disclosure is provided below, which is not intended to limit the protection scope of the claims.

The present disclosure provides a semiconductor integrated circuit design method and apparatus.

A first aspect of the embodiments of the present disclosure provides a semiconductor integrated circuit design method. The semiconductor integrated circuit design method includes:

determining, based on an original layout, an original length of an end of a gate structure extending out of an active region in which the gate structure is located;

redetermining, based on a preset rule and the original length, a correction length of the end of the gate structure extending out of the active region in which the gate structure is located; and integrating the original layout and the correction lengths, and forming an updated layout.

A second aspect of the embodiments of the present disclosure provides a semiconductor integrated circuit design apparatus. The semiconductor integrated circuit design apparatus includes:

a processing component, configured to determine an original length of an end of a gate structure extending out of an active region in which the gate structure is located;

a generation component, configured to redetermined, based on a preset rule and the original length, a correction length of the end of the gate structure extending out of the active region in which the gate structure is located; and an integration component, configured to integrate an original layout and the correction lengths, and form an updated layout.

Other aspects of the present disclosure are understandable upon reading and understanding of the drawings and detailed description.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

FIG. 3 is a schematic diagram of a gate structure forming a conductive path during ion implantation to a semiconductor structure;

FIG. 4 is a process flowchart of a semiconductor integrated circuit design method according to an exemplary embodiment;

DETAILED DESCRIPTION

The embodiments of the present disclosure are described in detail below with reference to the drawings. Those of ordinary skill in the art should understand that many technical details are proposed in the embodiments of the present disclosure to make the present application better understood. However, even without these technical details and various changes and modifications made based on the following embodiments, the technical solutions claimed in the present disclosure may still be realized.

Figure 1:
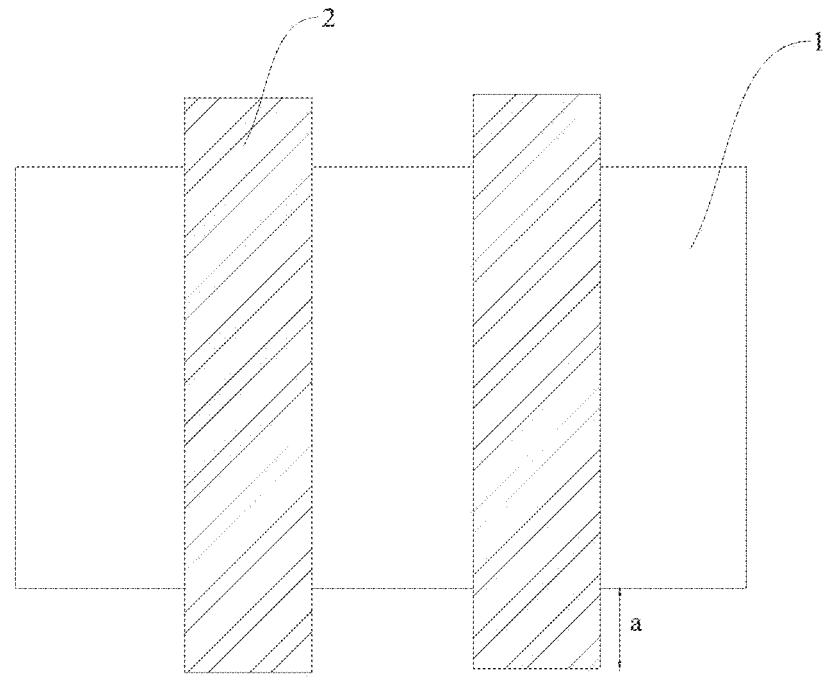
FIG. 1 is a schematic diagram of an original layout of a semiconductor integrated circuit design.
Figure 2:
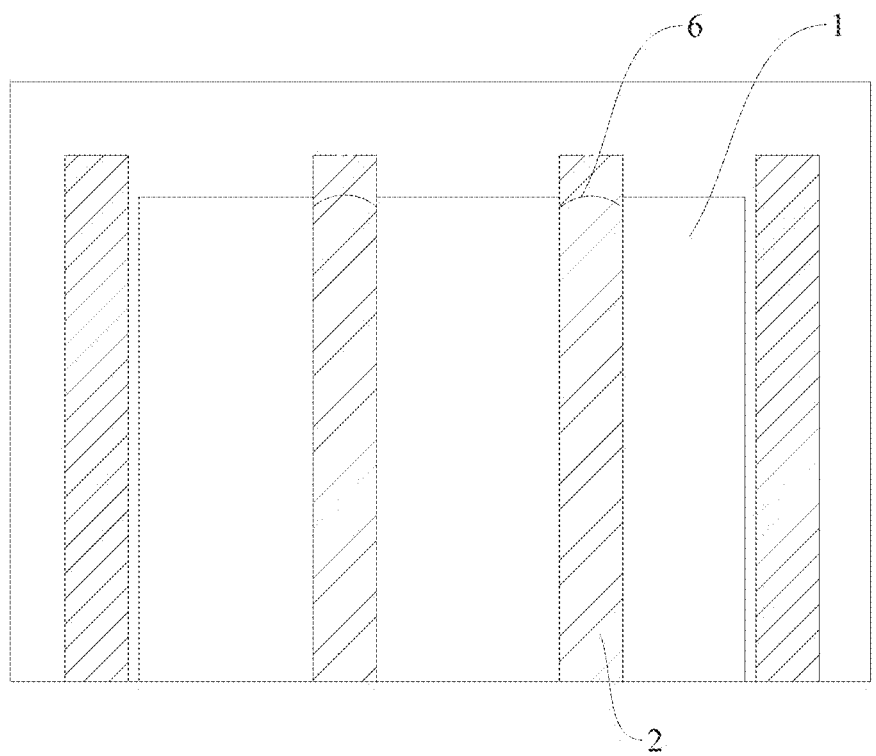
FIG. 2 is a schematic diagram of gate structures on which OPC has been performed in an original layout of a semiconductor integrated circuit design.

In a layout process of a semiconductor structure, as shown in FIG. 1, there is a problem in a memory layout design that a length a, of a gate structure 2 in a current channel of a transistor, extending out of an active region 1 is insufficient. According to the inventor's research, this phenomenon will cause the following problems: For example, an OPC result of this type of gate structure 2 may fall into an edge of the active region 1, as shown in FIG. 2. Consequently, an effective channel length 3 of the transistor at the intersection between the gate structure 2 and the active region 1 is insufficient, which reduces the device characteristics of the transistor. For another example, in subsequent production, when ions 4 are injected, they diffuse to sides of the active region 1. In this case, a conductive path may be formed on a sidewall of the active region 1 of the transistor. As a result, transistor leakage occurs, resulting in excessive power consumption of the memory.

Embodiments of the present disclosure provide a semiconductor integrated circuit design method and apparatus. In the memory layout design, a transistor with gate structures needing to be stretched may be automatically located. Under the premise of the DRC distance requirements, a gate structure with insufficient length extending out of an active region is stretched to the maximum allowable value, thus effectively avoiding changing positions of original transistors in the layout and reducing the project development cycle.

Figure 5:
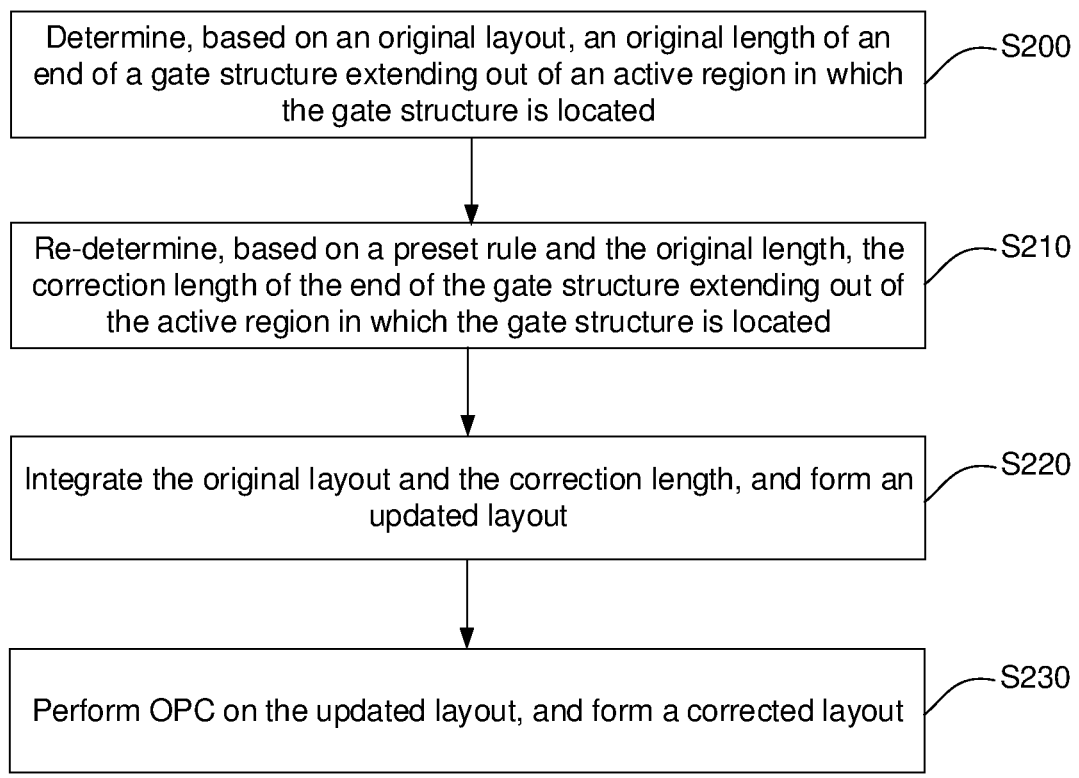
FIG. 5 is another process flowchart of a semiconductor integrated circuit design method according to an exemplary embodiment.
Figure 6:
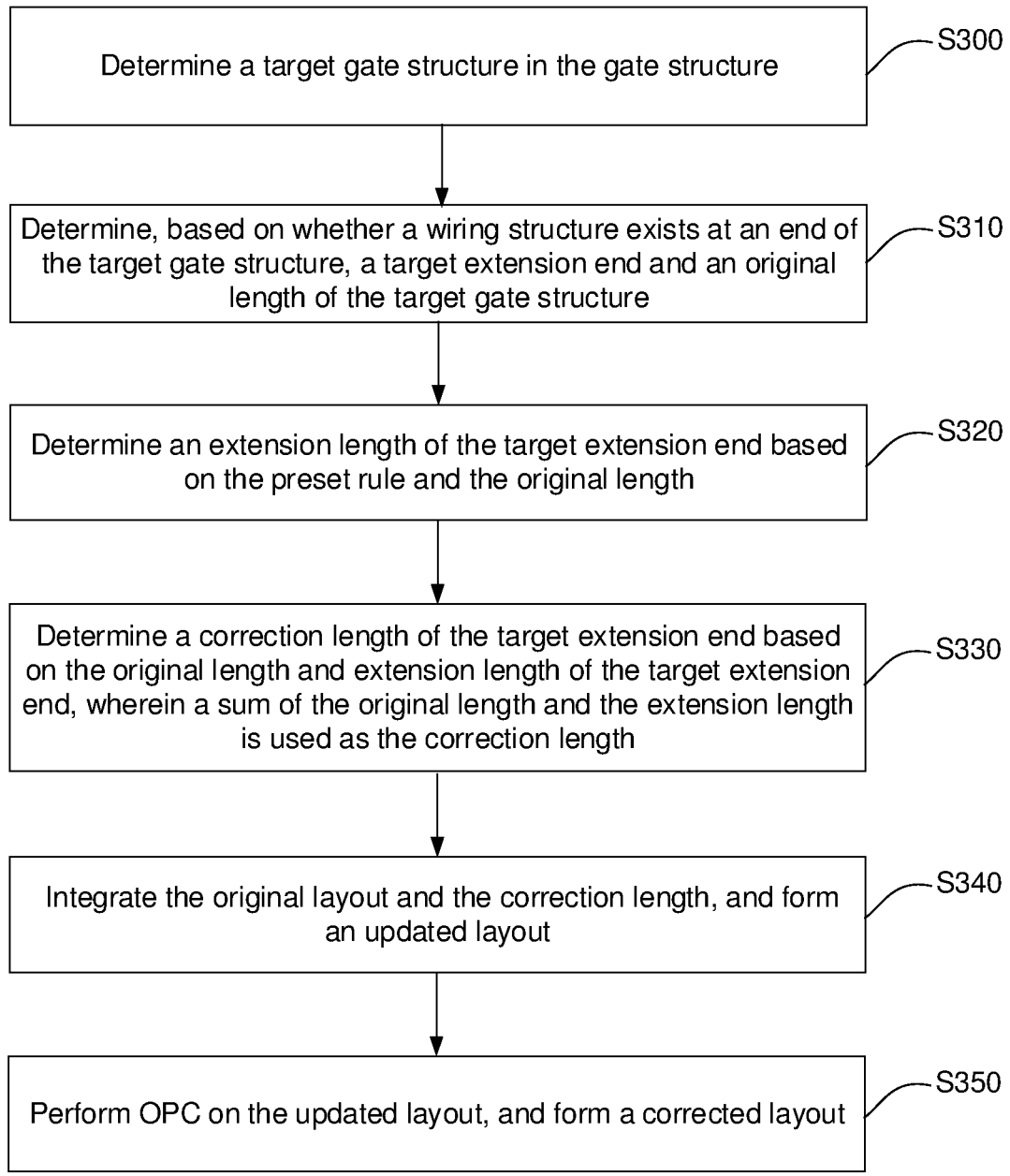
FIG. 6 is a process flowchart for obtaining an extension length in a semiconductor integrated circuit design method according to an exemplary embodiment.
Figure 7:
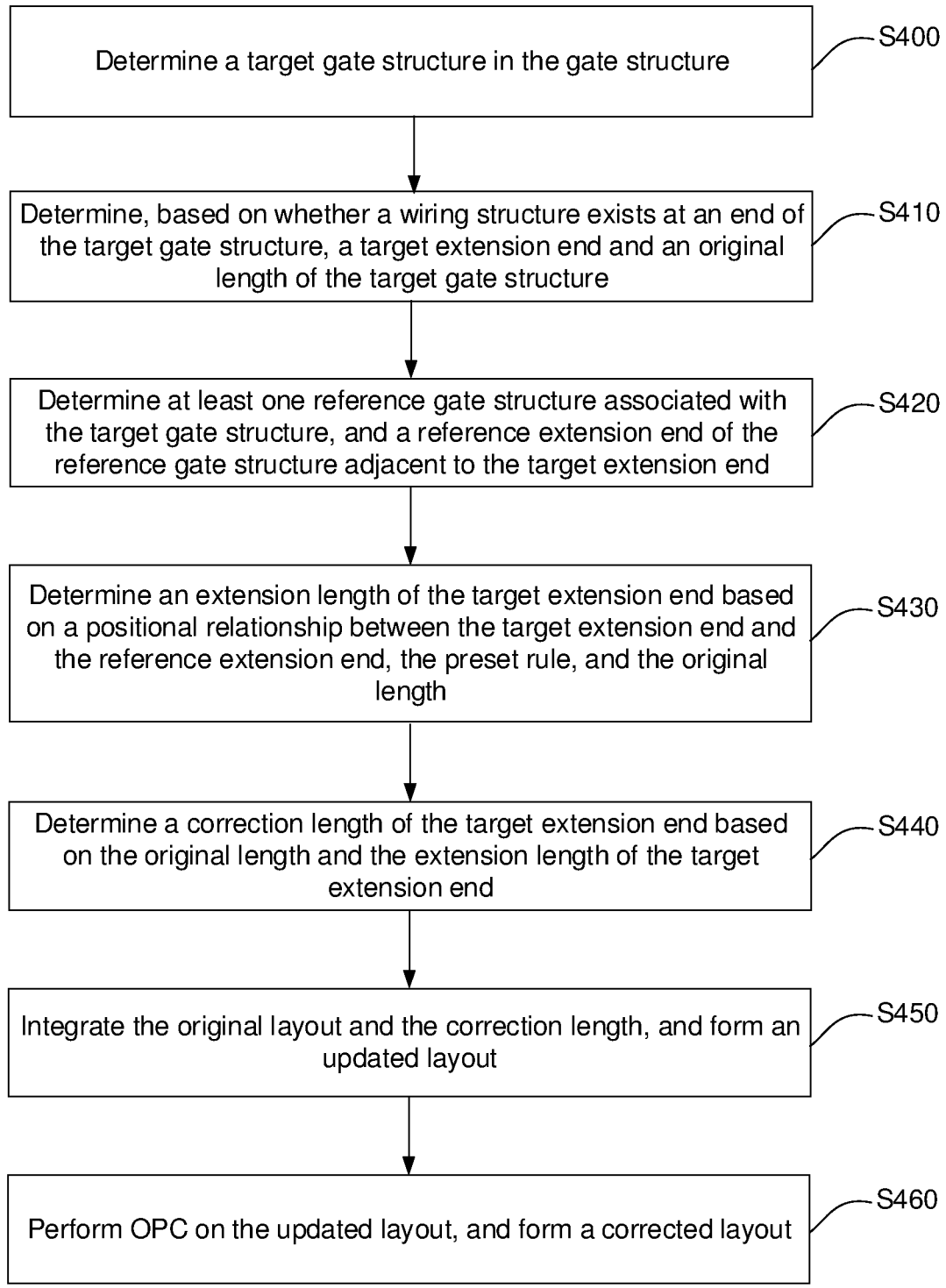
FIG. 7 is another process flowchart for obtaining an extension length in a semiconductor integrated circuit design method according to an exemplary embodiment.

An exemplary embodiment of the present disclosure provides a semiconductor integrated circuit design method. As shown in FIG. 4 to FIG. 18, FIG. 4 is a flowchart of a semiconductor integrated circuit design method according to an exemplary embodiment of the present disclosure, FIG. 5 is a flowchart of a semiconductor integrated circuit design method according to another exemplary embodiment of the present disclosure, and FIG. 6 to FIG. 18 are each a schematic diagram of a process for obtaining an extension length or a correction length in a semiconductor integrated circuit design method. The semiconductor integrated circuit design method is described below with reference to FIG. 4 to FIG. 18.

The semiconductor integrated circuit is not limited in the embodiments. A layout design of a dynamic random access memory (DRAM) is used as an example, but the embodiments are not limited to this, and the memory in the embodiments may alternatively be other structures.

As shown in FIG. 4, an exemplary embodiment of the present disclosure provides a semiconductor integrated circuit design method, including the following steps:

Step S100: Determine, based on an original layout, original lengths of ends of gate structures extending out of an active region in which the gate structures are located.

Step S110: Re-determine, based on a preset rule and the original lengths, correction lengths of the ends of the gate structures extending out of the active region in which the gate structures are located.

Step S120: Integrate the original layout and the correction lengths to form an updated layout.

According to the embodiment of the design method, multiple gate structures 2 in one active region 1 are intelligently adjusted, such that the lengths of the to-be-adjusted gate structures 2 extending out of the active region 1 can be stretched to the maximum extent under the premise of the DRC distance requirements, to effectively resolve the problems of insufficient effective channel lengths and transistor leakage caused by insufficient lengths of the gate structures extending out of the active region.

As shown in FIG. 5, an embodiment of the present disclosure provides a semiconductor integrated circuit design method, including the following steps:

Step S200: Determine, based on an original layout, an original length A of an end of a gate structure extending out of an active region in which the gate structure is located.

Step S210: Re-determine, based on a preset rule and the original length, a correction length of the end of the gate structure extending out of the active region in which the gate structure is located.

Step S220: Integrate the original layout and the correction lengths, and form an updated layout.

Step S230: Perform OPC on the updated layout, and form a corrected layout.

According to the embodiment of the design method, multiple gate structures 2 in one active region 1 are intelligently adjusted, such that the lengths of the to-be-adjusted gate structures 2 extending out of the active region 1 can be stretched to the maximum extent under the premise of the DRC distance requirements, to effectively resolve the problems of insufficient effective channel lengths and transistor leakage caused by insufficient lengths of the gate structures extending out of the active region. Meanwhile, the layout revision cycle of the layout engineer and the project development cycle can be reduced without changing positions of the transistors and wiring structures on the layout.

For example, in step S100 and step S200, the original length A of the end of gate structure extending out of the active region 1 in which the gate structure 2 is located is determined based on the original layout. The original layout is a layout pattern obtained by automatically converting a design circuit through electronics design automation (EDA) software. Generally, a layout pattern on which OPC has not been performed may be used as the original layout. Shapes of graphics in the original layout are not limited, and may be multiple strips arranged in rows or columns, or multiple strips arranged in a matrix. According to the actual device function, different sizes and spacings are designed for these strip structures. The strip structures may include the active region 1 and the gate structures 2 disposed in the active region 1. As shown in FIG. 5, a length of an end of each gate structure 2 extending out of the active region 1 is determined and recorded. In the present disclosure, records may be made by layout design software, for example, EDA software.

In step S110 and step S210, the correction length of the end of the gate structure extending out of the active region in which the gate structure is located is re-determined based on the preset rule and the original length.

The preset rule is as follows: Perform real-time calculation on one of the gate structures in the active region and its surrounding layout, analyze and measure a distance between associated gate structures, calculate a maximum value by which an end of each gate structure extending out of the active region can be stretched under the premise of the DRC distance requirements, and then intelligently stretch the end of the gate structure based on the maximum value calculated in real time. The stretch value is less than or equal to Value (Value is a maximum allowable stretch value designed for each gate structure), so as to effectively ensure that each stretchable gate structure can be stretched to the maximum extent, and still meets the DRC distance requirements for memory manufacturing.

The preset rule may be pre-stored in the layout design software.

According to an exemplary embodiment of the present disclosure, gate structures in one active region in a memory design layout are used as an example for description.

As shown in FIG. 6 and FIG. 9 to FIG. 18, the embodiments are descriptions of an implementation of step S210 in the above embodiment. The redetermining, based on a preset rule and the original lengths, correction lengths of the ends of the gate structures extending out of the active region in which the gate structures are located further includes the following steps:

Step S300: Determine a target gate structure in the gate structure.

To be specific, a gate structure 2 in the design layout whose end extending out of the active region 1 needs to be stretched is determined as the target gate structure 21.

Step S310: Determine, based on whether a wiring structure exists at an end of the target gate structure, a target extension end and an original length of the target gate structure.

The wiring structure 5 is used to connect multiple gate structures 2 arranged side by side in the same active region 1, and the wiring structure 5 and the gate structures 2 are made of the same material and are in the same horizontal layer. One end of the gate structure 2 is connected to the wiring structure 5, and therefore, this end will not be stretched. Then, an end of the target gate structure 21 without the wiring structure 5 is determined as the target extension end 211, a length of the target extension end 211 extending out of the active region 1 in which the target extension end 211 is located is used as the original length, and a value of the original length is denoted as A1.

Step S320: Determine an extension length of the target extension end based on the preset rule and the original length.

A value of the extension length is denoted as B1.

In this step, the determining an extension length of the target extension end based on the preset rule and the original length is as follows: First, the first preset length is obtained, where the first preset length is used to represent a maximum distance by which the end of the gate structure is allowed to extend out of the active region in which the gate structure is located, and the first preset length is Value.

Then, the extension length is determined to be less than or equal to a difference between the first preset length and the original length, that is, a difference between Value and A1 is greater than or equal to B1, such that the stretched target gate structure 21 meets the DRC Distance requirements.

Step S330: Determine a correction length of the target extension end based on the original length and extension length of the target extension end, where a sum of the original length and the extension length is used as the correction length.

That is, the correction length S1 is equal to the sum of A1 and B1.

Step S340: Integrate the original layout and the correction length, and form an updated layout.

The stretched gate structure 2 is integrated with other gate structures that meet the design requirements in the original layout, to form the updated layout.

Step S350: Perform OPC on the updated layout, and form a corrected layout.

Through the implementation of the design method in the disclosed embodiment, target extension ends 211 of multiple target gate structures 21 in the active region 1 are intelligently stretched, such that the target extension ends 211 of the target gate structures 21 extending out of the active region 1 can be stretched to the maximum extent under the premise of the DRC distance requirements, to effectively resolve the problems of insufficient effective channel lengths and transistor leakage caused by insufficient lengths of the gate structures extending out of the active region. Meanwhile, the layout revision cycle of the layout engineer and the project development cycle can be reduced without changing positions of the transistors and wiring structures on the layout.

According to an exemplary embodiment of the present disclosure, multiple active regions 1 in the memory layout are used as an example for description, where the multiple active regions 1 are arranged at intervals along a same line and at intervals along a same column.

As shown in FIG. 7 to FIG. 17, the re-determining, based on a preset rule and the original lengths, correction lengths of the ends of the gate structures extending out of the active region in which the gate structures are located further includes the following steps:

Step S400: Determine a target gate structure in the gate structure.

To be specific, a gate structure 2 in the design layout whose end extending out of the active region 1 needs to be stretched is determined as the target gate structure 21

Step S410: Determine, based on whether a wiring structure exists at an end of the target gate structure, a target extension end and an original length of the target gate structure.

The wiring structure 5 is used to connect multiple gate structures 2 arranged side by side in the same active region 1, and the wiring structure 5 and the gate structures 2 are made of the same material and are in the same horizontal layer. One end of the gate structure 2 is connected to the wiring structure 5, and therefore, this end will not be stretched. Then, an end of the target gate structure 21 without the wiring structure 5 is determined as the target extension end 211, a length of the target extension end 211 extending out of the active region 1 in which the target extension end 211 is located is used as the original length, and a value of the original length is denoted as A2.

Step S420: Determine at least one reference gate structure associated with the target gate structure, and a reference extension end of the reference gate structure adjacent to the target extension end.

In this embodiment, the target gate structure 21 and its associated reference gate structure 22 are respectively arranged in two adjacent active regions 1 in the same column, the reference gate structure 22 is disposed opposite to the target gate structure 21, and an end adjacent to the target gate structure 21 is determined as the reference extension end 221.

A reference gate structure 22 arranged between two adjacent active regions 1 in the same row is a dummy gate 23. The dummy gate 23 may be arranged opposite to a target gate structure 21 in an adjacent active region 1 along an extending direction of the dummy gate 23. In this case, an extension length of a reference extension end of the dummy gate 23 is fixed, and only a length of a target extension end 211 of the target gate structure 21 associated with the dummy gate 23 is increased based on the preset rule and the original length.

Step S430: Determine an extension length of the target extension end based on a positional relationship between the target extension end and the reference extension end, the preset rule, and the original length.

A value of the extension length is denoted as B2.

Step S440: Determine a correction length of the target extension end based on the original length and the extension length of the target extension end, where a sum of the original length and the extension length is used as the correction length.

That is, the correction length S2 is equal to a sum of A2 and B2.

Step S450: Integrate the original layout and the correction length, and form an updated layout.

The stretched gate structure 2 is integrated with other gate structures that meet the design requirements in the original layout, to form the updated layout.

Step S460: Perform OPC on the updated layout, and form a corrected layout.

Figure 8:
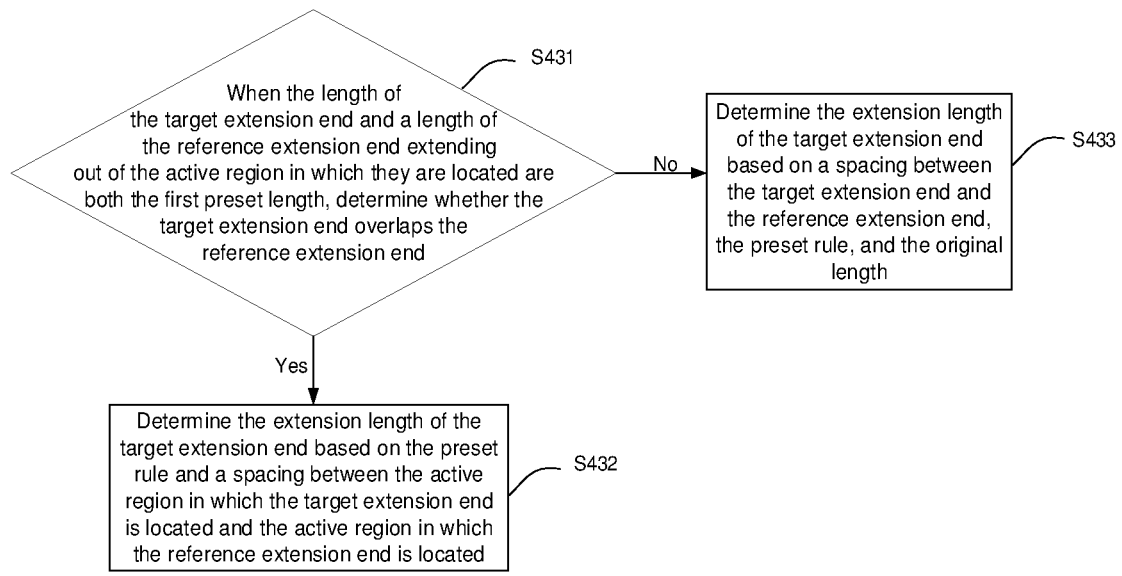
FIG. 8 is a block diagram of sub-steps for obtaining the extension length in the process flowchart in FIG. 7.
Figure 9:
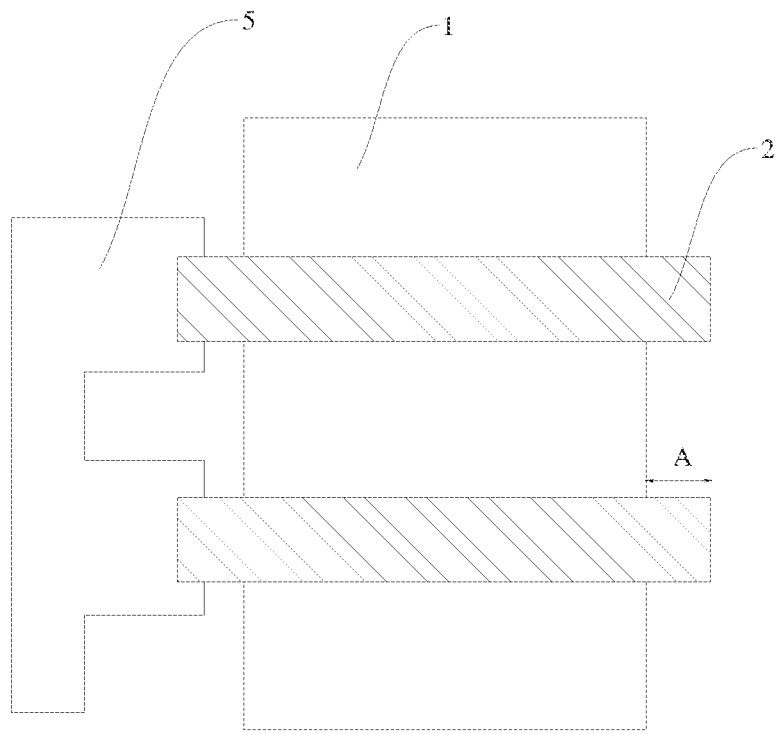
FIG. 9 is a schematic diagram of an original layout in a semiconductor integrated circuit design method according to an exemplary embodiment.
Figure 10:
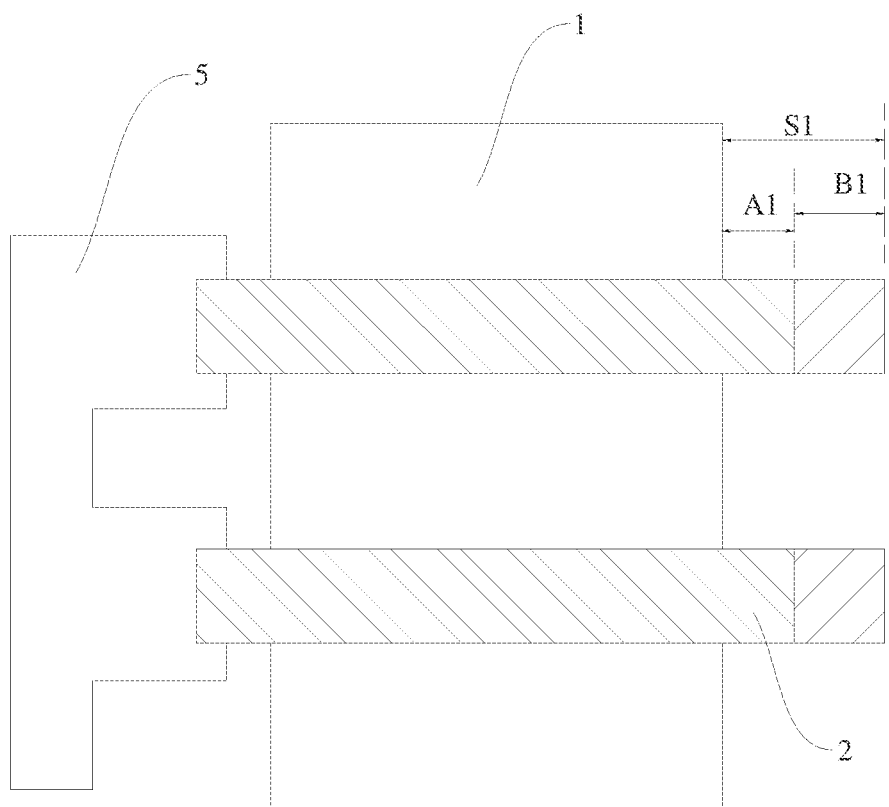
FIG. 10 is a schematic diagram of a gate structure after stretching in a semiconductor integrated circuit design method according to an exemplary embodiment.
Figure 11:
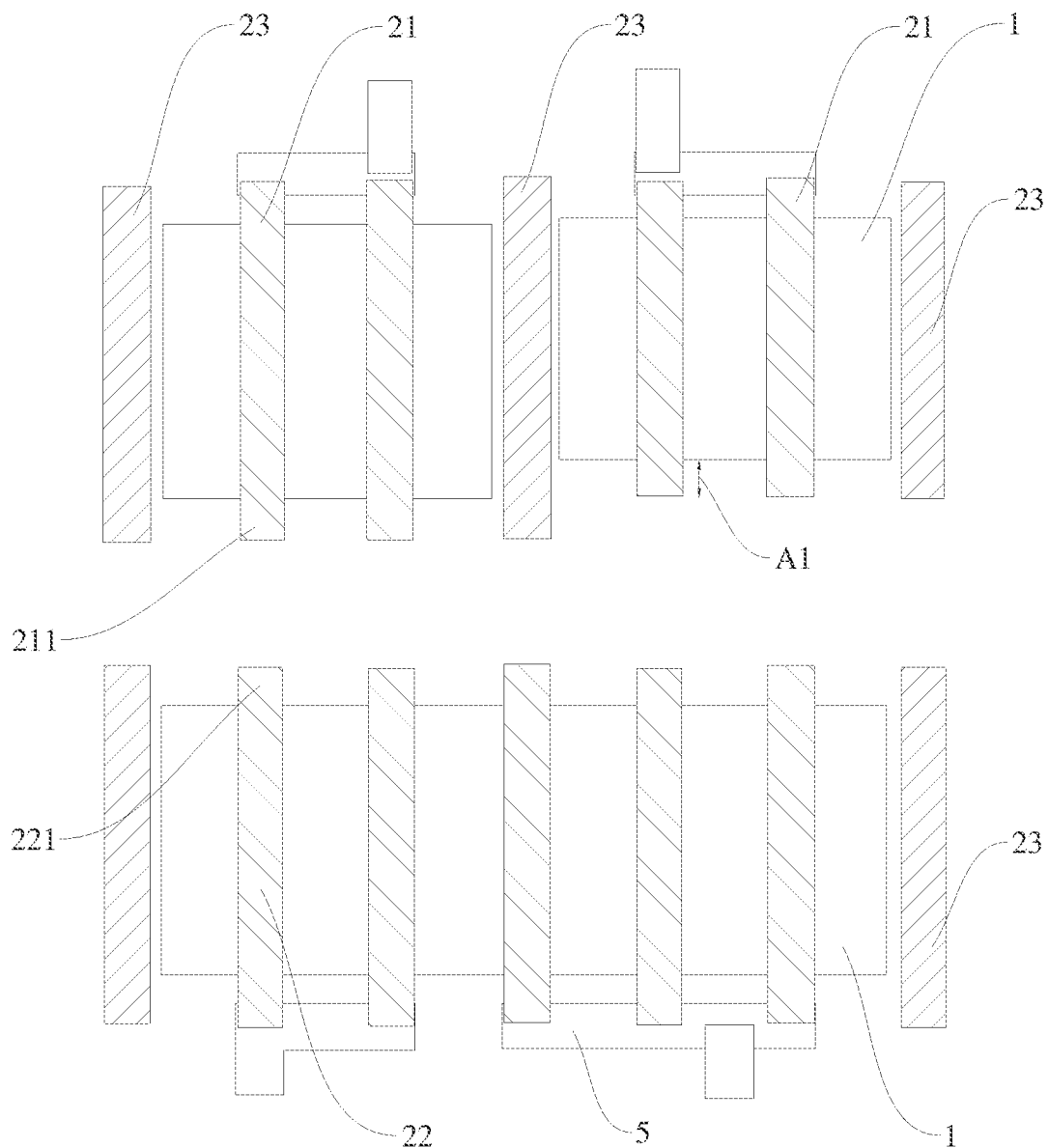
FIG. 11 is another schematic diagram of an original layout in a semiconductor integrated circuit design method according to an exemplary embodiment.
Figure 12:
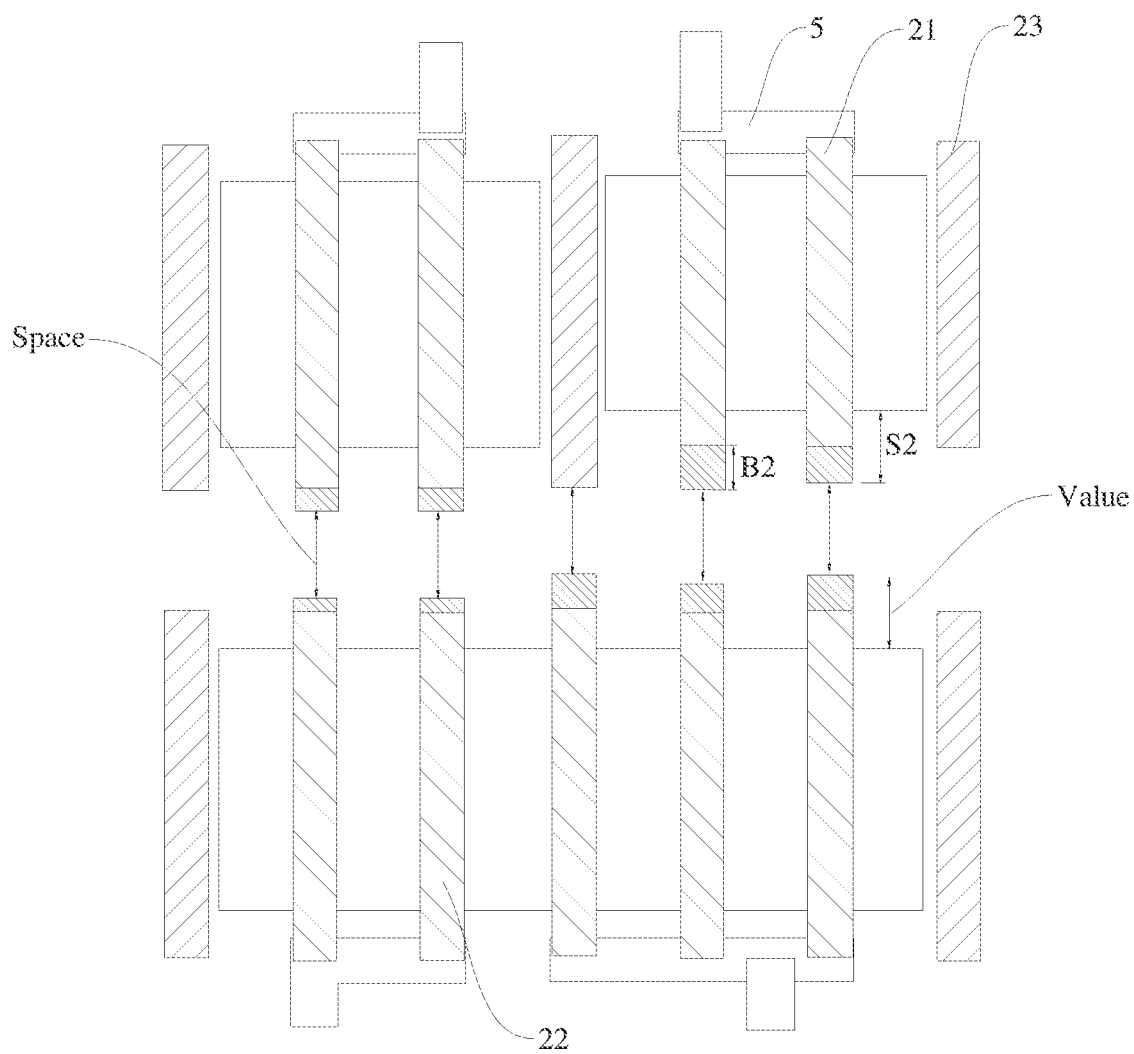
FIG. 12 is a schematic diagram of a calculation process for an extension length of a gate structure in a semiconductor integrated circuit design method according to an exemplary embodiment.
Figure 13:
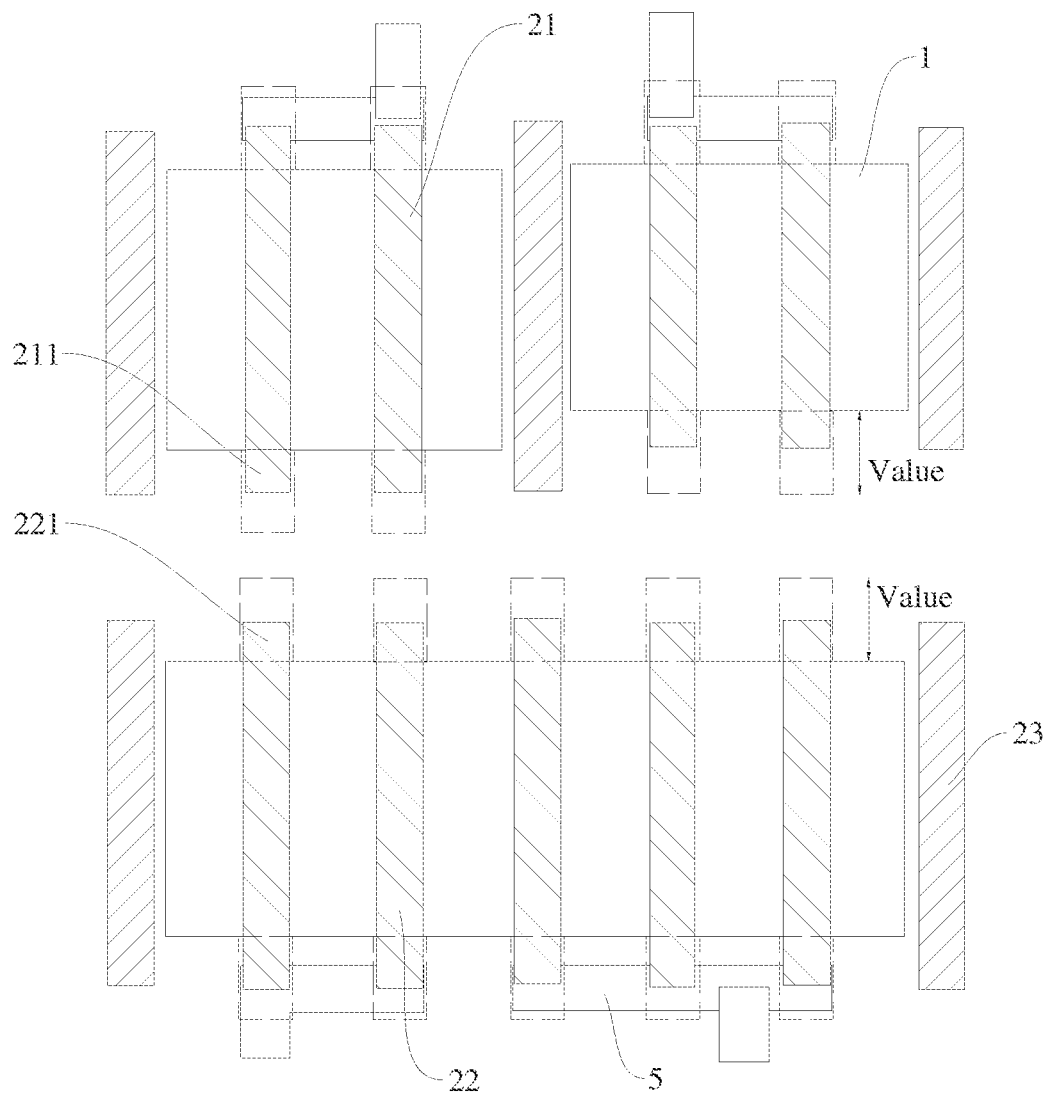
FIG. 13 is a schematic diagram of Value in a semiconductor integrated circuit design method according to an exemplary embodiment.
Figure 14:
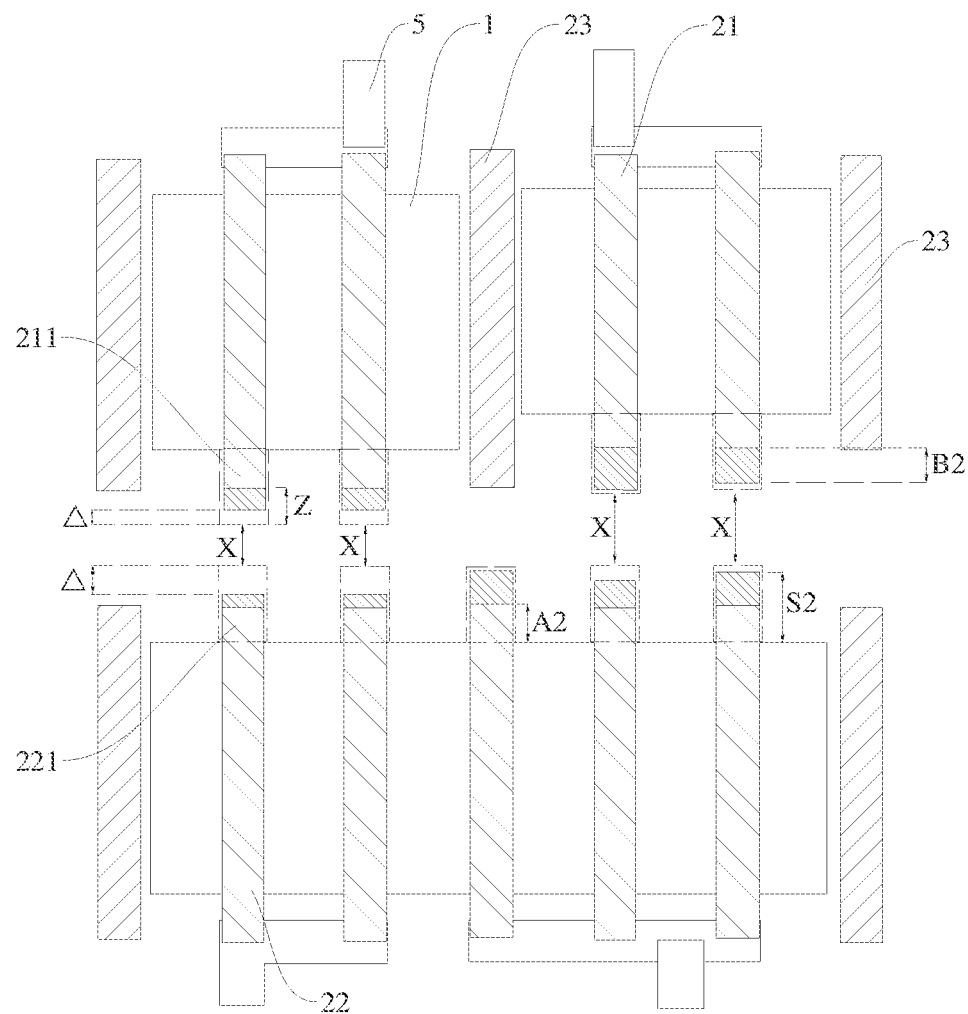
FIG. 14 is a schematic diagram of a calculation process for an extension length of a gate structure in a semiconductor integrated circuit design method according to an exemplary embodiment.

In an embodiment, the step S430 of determining an extension length of the target extension end based on a positional relationship between the target extension end and the reference extension end, the preset rule, and the original length includes the following steps shown in FIG. 8:

Step S431: When the length of the target extension end and a length of the reference extension end extending out of the active region in which they are located are both the first preset length, determine whether the target extension end overlaps the reference extension end.

The first preset length is Value.

When the target extension end overlaps the reference extension end, step S432 is performed; or when the target extension end does not overlap the reference extension end, step S433 is performed.

Step S432: When the target extension end overlaps the reference extension end, determine the extension length of the target extension end based on the preset rule and a spacing between the active region in which the target extension end is located and the active region in which the reference extension end is located.

In this step, a distance between opposite sides of the active region 1 in which the target extension end 211 is located and the active region 1 in which the reference extension end 221 is located is first obtained and used as the spacing, where a value of the spacing is denoted as Y.

Because original lengths of the gate structures 2 extending out of the active regions 1 on the layout are different, the spacing Y between the active region 1 in which the target extension end 211 is located and the active region 1 in which the reference extension end 221 is located is a dynamically changing value. In the present disclosure, the spacing Y may be calculated and recorded in real time through layout design software, for example, EDA software.

A second preset length is obtained, where the second preset length is used to represent a minimum distance between ends of two adjacent gate structures 2 along the extending direction of the gate structures 2, and a value of the second preset length is denoted as Space.

Then, half of a difference between the spacing and the second preset length is used as the extension length B2. That is, B2 is equal to a half of the difference between Y and Space.

Step S433: When the target extension end does not overlap the reference extension end, determine the extension length of the target extension end based on a spacing between the target extension end and the reference extension end, the preset rule, and the original length.

In this step, the spacing between the target extension end 211 and the reference extension end 221 is obtained, and a value of the spacing is denoted as X.

A second preset length is obtained, where the second preset length is used to represent a minimum distance between ends of two adjacent gate structures 2 along the extending direction of the gate structures 2, that is, Space.

Whether the spacing X is greater than or equal to the second preset length Space is determined.

When the spacing is greater than or equal to the second preset length, that is, X is greater than or equal to Space, the value of the extension length is the difference between the first preset length and the original length, that is, B2 is equal to a difference between X and Space.

When the spacing is less than the second preset length, that is, X is smaller than Space, the extension length B2 is a difference between a first difference and a retract distance, where the first difference is the difference between the first preset length and the original length, the first difference is denoted as Z, then Z is equal to a difference between Value and A2, and the retract distance is 1%-20% of the first preset length. That is, when X is smaller than Space, both the target extension end of the target gate structure and the reference extension end of the reference gate structure need to be retracted by a predetermined distance, which is the retract distance, and the retract distance is denoted as Δ. In this case, the extension length B2 of the target extension end 211 of the target gate structure 21 or the reference extension end 221 of the reference gate structure 22 is a difference between Z and Δ.

Because opposite distances between the target gate structures 21 and associated reference gate structures 22 in the layout are different, a selected value of the retract distance Δ is also different.

Because original lengths of the gate structures 2 extending out of the active regions 1 on the layout are different, a value of the spacing X between the target extension end 211 and the reference extension end 221 is a dynamically changing value. In the present disclosure, the spacing X may be calculated and recorded in real time through layout design software, for example, EDA software.

According to the implementation of the design method in the disclosed embodiment, in multiple adjacent active regions, the target extension end 211 of the target gate structure 21 and the reference extension end 221 of the reference gate structure 22 extending out of the active regions both can be stretched to the maximum extent under the premise of the DRC distance requirements, to effectively resolve the problems of insufficient effective channel lengths and transistor leakage caused by insufficient lengths of the gate structures 2 extending out of the active regions. Meanwhile, the layout revision cycle of the layout engineer and the project development cycle can be reduced without changing positions of the transistors and wiring structures on the layout.

The above disclosed embodiment is described by using an example in which the target gate structure is disposed opposite to the reference gate structure, and widths of the two are the same.

Figure 15:
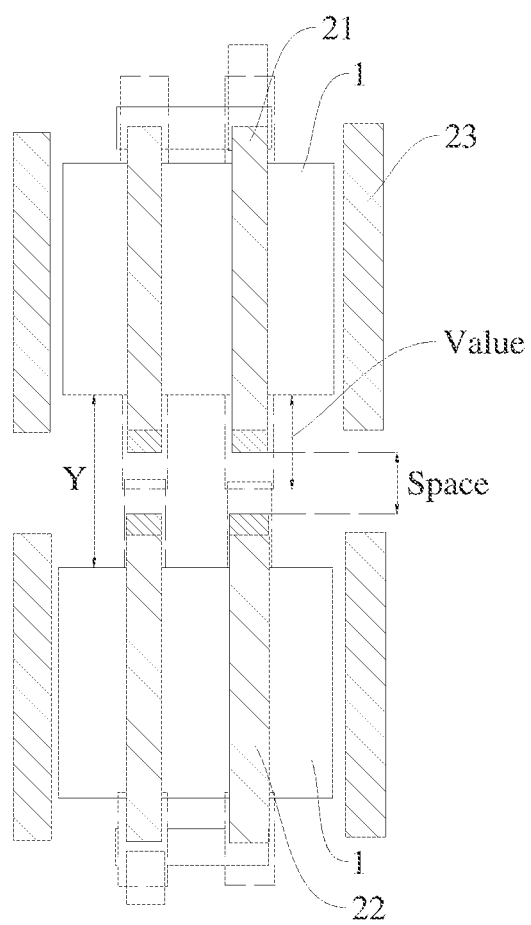
FIG. 15 is a schematic diagram of a calculation process for an extension length of a gate structure in a semiconductor integrated circuit design method according to an exemplary embodiment.

As shown in FIG. 15, when the target gate structure 21 and the reference gate structure 22 are alternately disposed, there are at least two reference gate structures 22 associated with the target gate structure 21. In this case, connection distances between the target extension end 211 of the target gate structure 21 and reference extension ends 221 of multiple reference gate structures 22 are obtained; multiple candidate lengths are determined based on the multiple connection distances; and a minimum value of the multiple candidate lengths is determined as the extension length.

Figure 16:
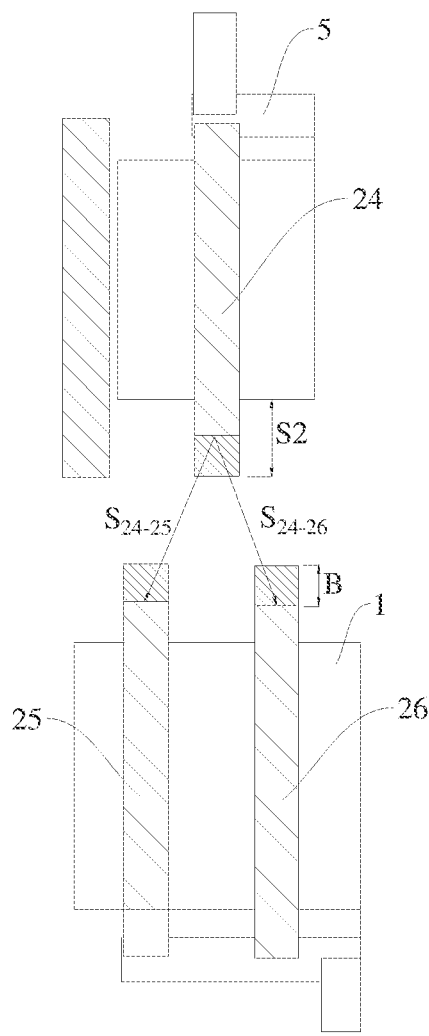
FIG. 16 to FIG. 18 are each a schematic diagram of a calculation process for an extension length when a target gate structure corresponds to multiple reference gate structures in a semiconductor integrated circuit design method according to an exemplary embodiment.
Figure 17:
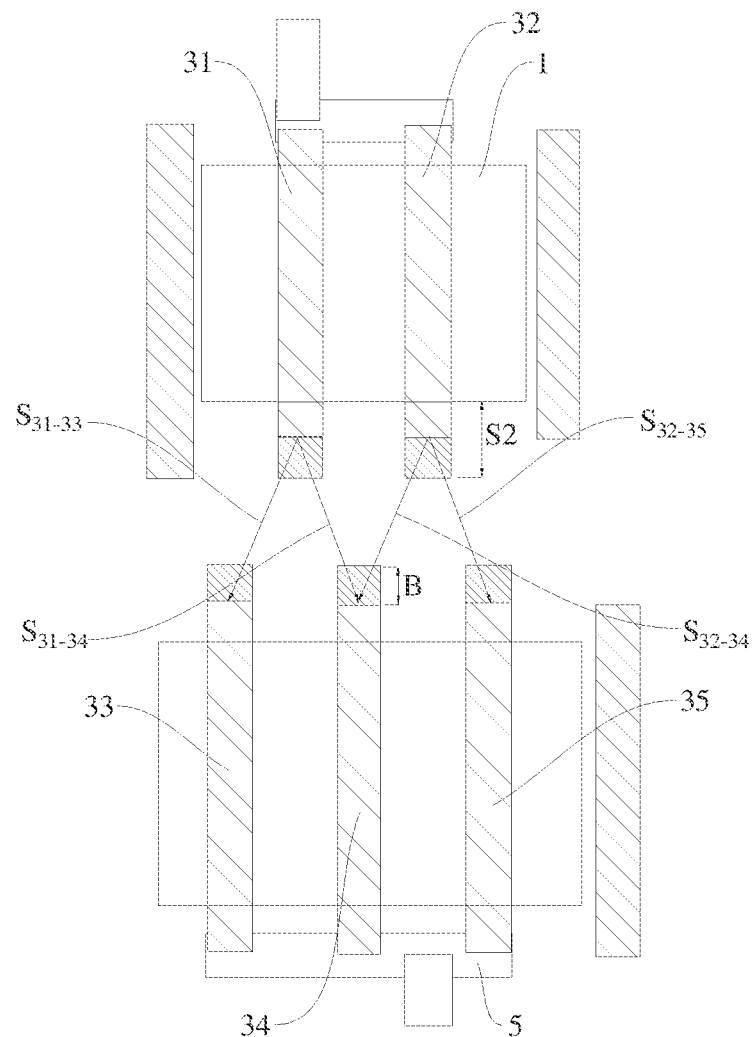

For example, as shown in FIG. 16, in an embodiment, a first target gate structure 24 is associated with a first reference gate structure 25 and a second reference gate structure 26. The first reference gate structure 25 and the second reference gate structure 26 are separately disposed on two sides of the first target gate structure 24. In this case, values of a connection distance $S_{24-25}$ and a connection distance $S_{24-26}$ need to be calculated and recorded in real time; then a first candidate length and a second candidate length by which the first target gate structure 24 can be stretched are determined based on the values of the connection distance $S_{24-25}$ and the connection distance $S_{24-26}$, under the premise of the DRC distance requirements; a minimum value of the candidate lengths is selected as the extension length of the first target gate structure 24, the first reference gate structure 25, and the second reference gate structure 26; and the first target gate structure 24, the first reference gate structure 25, and the second reference gate structure 26 are intelligently stretched.

When the first target gate structure 24 extends out of its active region 1 by a first preset length, the first reference gate structure 25 extends out of its active region 1 by a first preset length, and the second reference gate structure 26 extends out of its active region 1 by a first preset length, where the above three first preset lengths have overlapping projections on a same side (for example, a side perpendicular to the horizontal plane of the layout), under the premise of the DRC distance requirements, the extension lengths by which the first target gate structure 24, the first reference gate structure 25, and the second reference gate structure 26 can be stretched may be calculated with reference to steps S431 to S433, and each candidate lengths is calculated by simply replacing X or Y in the calculation steps with corresponding $S_{24-25}$ or $S_{24-26}$. The calculation processes are not repeated here.

When two adjacent target gate structures in a same active region are associated with a same reference gate structure in another active region, to be specific, a second target gate structure 31 and a third target gate structure 32 are both associated with a third reference gate structure 34, and meanwhile, the second target gate structure 31 is also associated with a fourth reference gate structure 33, and a third target gate structure 32 is associated with a fifth reference gate structure 35, values of a connection distance $S_{31-33}$, a connection distance $S_{31-34}$, a connection distance $S_{32-35}$ and a connection distance $S_{32-34}$ need to be calculated and recorded in real time; then multiple candidate distances by which the second target gate structure 31 and the third target gate structure 32 can be respectively stretched are determined based on the connection distance $S_{31-33}$, the connection distance $S_{31-34}$, the connection distance $S_{32-35}$ and the connection distance $S_{32-34}$ under the premise of the DRC distance requirements; and a minimum value of the candidate lengths is selected as an extension length of the second target gate structure 31, the third target gate structure 32, the third reference gate structure 34, the fourth reference gate structure 33 and the fifth reference gate structure 35, to perform intelligent stretching. Calculation of the candidate lengths may refer to steps S431 to S433, and each candidate lengths is calculated by simply replacing X or Y in the calculation steps with the corresponding connection distance $S_{31-33}$, connection distance $S_{31-34}$, connection distance $S_{32-35}$ and connection distance $S_{32-34}$. The calculation processes are not repeated here.

Figure 18:
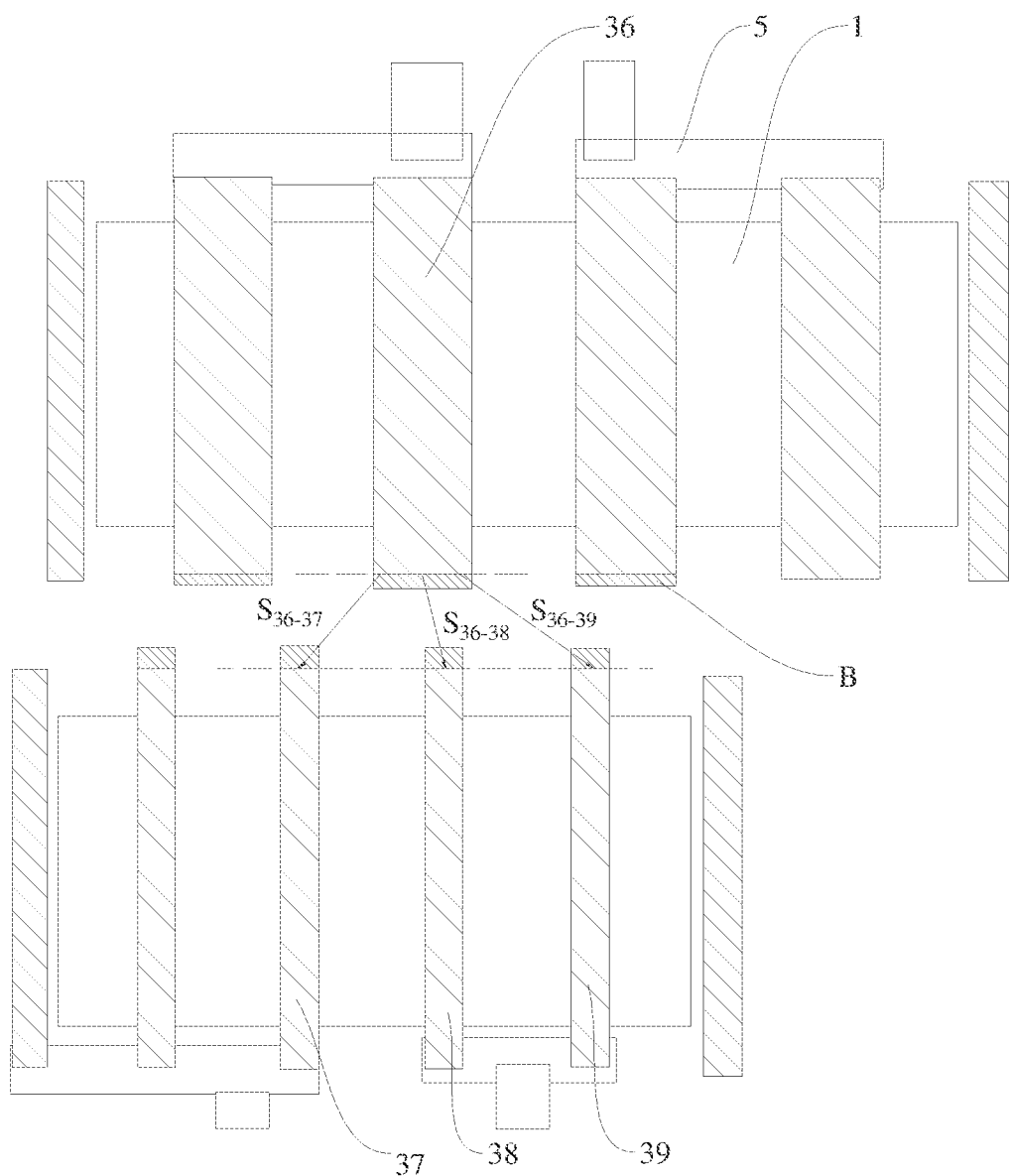

For another example, as shown in FIG. 18, when widths of the target gate structure and the reference gate structure are different, and they are alternately arranged, one target gate structure may be associated with three reference gate structures. To be specific, a fourth target gate structure 36 is associated with a sixth reference gate structure 37, a seventh reference gate structure 38 and an eighth reference gate structure 39. In this case, values of a connection distance $S_{36-37}$, a connection distance $S_{36-38}$ and a connection distance $S_{36-39}$ need to be calculated and recorded in real time; then multiple candidate distances by which the fourth target gate structure 36 can be stretched are determined based on the connection distance $S_{36-37}$, the connection distance $S_{36-38}$ and the connection distance $S_{36-39}$ under the premise of the DRC distance requirements; and a minimum value of the candidate lengths is selected as an extension length of the fourth target gate structure 36, the sixth target gate structure 37, the seventh target gate structure 38, and the eighth reference gate structure 39, to perform intelligent stretching. Calculation of the candidate lengths may refer to steps S431 to S433, and each candidate lengths is calculated by simply replacing X or Y in the calculation steps with the corresponding connection distance $S_{36-37}$, the connection distance $S_{36-38}$ and the connection distance $S_{36-39}$. The calculation processes are not repeated here.

Figure 19:
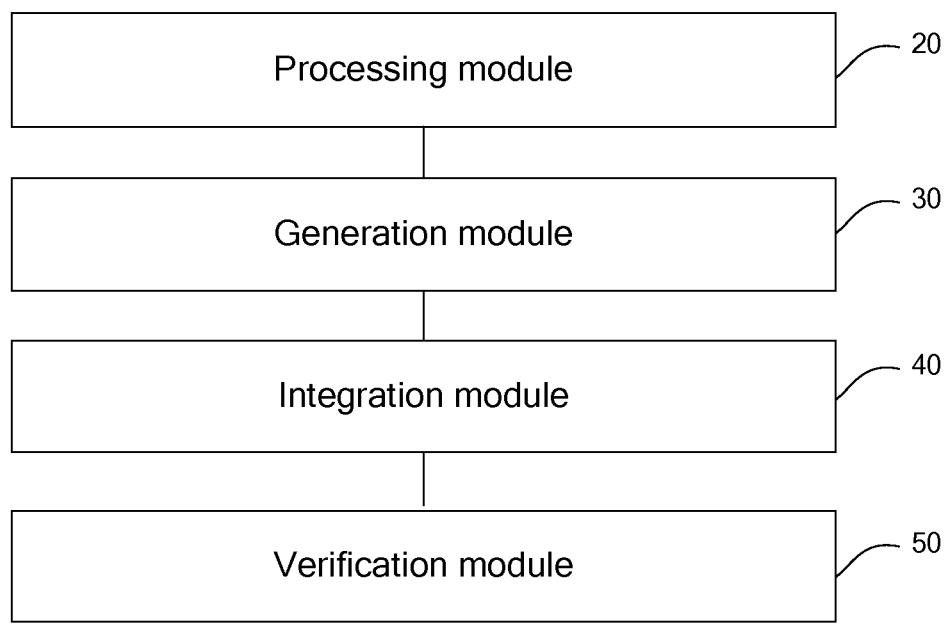
FIG. 19 is a schematic diagram of a semiconductor integrated circuit design apparatus according to an exemplary embodiment.

As shown in FIG. 19, an embodiment of the present disclosure further provides a semiconductor integrated circuit design apparatus, including:

A processing component 20 is configured to determine original lengths of ends of gate structures extending out of an active region in which the gate structures are located.

A generation component 30 is configured to redetermine, based on a preset rule and the original lengths, correction lengths of the ends of the gate structures extending out of the active region in which the gate structures are located. The generation component 30 is configured to: determine a target gate structure from the gate structures; determine, based on whether a wiring structure exists at an end of the target gate structure, an end of the target gate structure without the wiring structure as a target extension end, where a length of the target extension end extending out of the active region is used as the original length; determine an extension length of the target extension end based on the preset rule and the original length; and determine the correction length of the target extension end based on the original length and the extension length of the target extension end, where a sum of the original length and the extension length is used as the correction length.

The generation component 30 may be further configured to dynamically calculate and record related distances between the target gate structure and reference gate structure associated therewith, such as a spacing Y and a spacing X.

An integration component 40 is configured to integrate the original layout and the correction lengths to form an updated layout.

A verification component 50 is configured to perform OPC on the updated layout to form a corrected layout.

Through the semiconductor integrated circuit design apparatus, even the distances between associated gate structures and direction structures at different positions in the original layout are complex, an extension length of each gate structure is calculated and recorded in real time under the premise of the DRC distance requirements, to intelligently stretch the gate structure to the maximum extent, such that the corrected layout does not violate the DRC rules for memory manufacturing. In addition, the apparatus corrects the original layout quickly and accurately, and is simple to use. It is unnecessary to change the positions of the gate structures in the original layout and re-wire, so as to effectively reduce the project development cycle of the layout engineer.

The embodiments or implementations of this specification are described in a progressive manner, and each embodiment focuses on differences from other embodiments. The same or similar parts between the embodiments may refer to each other.

In the descriptions of this specification, a description with reference to the term "one implementation", "some implementations", "an exemplary implementation", "an example", "a specific example", "some examples", or the like means that a specific feature, structure, material, or characteristic described in combination with the implementation(s) or example(s) is included in at least one implementation or example of the present disclosure.

In this specification, the schematic expression of the above terms does not necessarily refer to the same implementation or example. Moreover, the described specific feature, structure, material or characteristic may be combined in an appropriate manner in any one or more implementations or examples.

Finally, it should be noted that the foregoing embodiments are used only to explain the technical solutions of the present disclosure, but are not intended to limit the present disclosure. Although the present disclosure has been described in detail with reference to the foregoing embodiments, those of ordinary skill in the art should understand that they can still modify the technical solutions described in the foregoing embodiments, or make equivalent substitutions on some or all technical features therein. The modifications or substitutions do not make the essence of the corresponding technical solutions deviate from the spirit and scope of the technical solutions of the embodiments of the present disclosure.

INDUSTRIAL APPLICABILITY

According to the semiconductor integrated circuit design method and apparatus provided in the embodiments of the present disclosure, the to-be-adjusted gate structure can be automatically located in the layout, and a gate structure with insufficient length extending out of an active region is stretched to a maximum allowable value under the premise of the DRC distance requirements, thus effectively avoiding changing positions of original transistors in the layout and reducing the project development cycle.

The invention claimed is:

1. A semiconductor integrated circuit design method, wherein the method comprises:
   determining, based on an original layout, an original length of an end of a gate structure extending out of an active region in which the gate structure is located;
   redetermining, based on a preset rule and the original length, a correction length of the end of the gate structure extending out of the active region in which the gate structure is located; and
   integrating the original layout and the correction lengths, and forming an updated layout;
   wherein the redetermining, based on a preset rule and the original length, a correction length of the end of the gate structure extending out of the active region in which the gate structure is located comprises:
   determining a target gate structure in the gate structure;
   determining, based on whether a wiring structure exists at an end of the target gate structure, an end of the target gate structure without the wiring structure as a target extension end, wherein a length of the target extension end extending out of the active region is used as the original length;
   determining an extension length of the target extension end based on the preset rule and the original length; and
   determining a correction length of the target extension end based on the original length and the extension length of the target extension end;
   wherein the determining an extension length of the target extension end based on the preset rule and the original length comprises:
   obtaining a first preset length, wherein the first preset length is used to represent a maximum distance by which the end of the gate structure is allowed to extend out of the active region; and
   determining that the extension length is less than or equal to a difference between the first preset length and the original length.

2. The method according to claim 1, wherein the determining a correction length of the target extension end based on the original length and the extension length of the target extension end comprises:
   using a sum of the original length and the extension length as the correction length.

3. The method according to claim 1, wherein the determining an extension length of the target extension end based on the preset rule and the original length comprises:
   determining at least one reference gate structure associated with the target gate structure and a reference extension end of the reference gate structure adjacent to the target extension end, wherein the reference extension end is disposed opposite to the target gate structure; and determining the extension length of the target extension end based on a positional relationship between the target extension end and the reference extension end, the preset rule, and the original length.

4. The method according to claim 3, wherein when the reference gate structure is a dummy gate, an extension length of the reference extension end is fixed and an extension length of the target gate structure is determined.

5. The method according to claim 3, wherein the determining the extension length of the target extension end based on a positional relationship between the target extension end and the reference extension end, the preset rule, and the original length comprises:

when the length of the target extension end and a length of the reference extension end extending out of the active region are both the first preset length, determining whether the target extension end overlaps the reference extension end; and when yes, determining the extension length of the target extension end based on the preset rule and a spacing between the active region in which the target extension end is located and the active region in which the reference extension end is located; or when no, determining the extension length of the target extension end based on the preset rule, the original length, and a spacing between the target extension end and the reference extension end.

6. The method according to claim 5, wherein the determining the extension length of the target extension end based on the preset rule and a spacing between the active region in which the target extension end is located and the active region in which the reference extension end is located comprises:

obtaining a distance between opposite sides of the active region in which the target extension end is located and the active region in which the reference extension end is located, and using the distance as the spacing;

obtaining a second preset length, wherein the second preset length is used to represent a minimum distance between ends of two adjacent gate structures along an extending direction of the gate structures; and using a half of a difference between the spacing and the second preset length as the extension length.

7. The method according to claim 5, wherein the determining the extension length of the target extension end based on the preset rule, the original length, and a spacing between the target extension end and the reference extension end comprises:

obtaining the spacing between the target extension end and the reference extension end;

obtaining a second preset length, wherein the second preset length is used to represent a minimum distance between ends of two adjacent gate structures along an extending direction of the gate structures; and determining whether the spacing is greater than or equal to the second preset length; and when yes, using the difference between the first preset length and the original length as the extension length; or when no, using a difference between a first difference and a retract distance as the extension length, wherein the first difference is a difference between the first preset length and the original length, and the retract distance is 1%-20% of the first preset length.

8. The method according to claim 3, wherein when the target gate structure is associated with multiple reference gate structures, the method further comprises:

separately obtaining a connection distance between the target extension end and each of the multiple reference extension ends;

determining multiple candidate lengths based on multiple connection distances; and determining a minimum value of the multiple candidate lengths as the extension length.

9. The method according to claim 1, wherein after the integrating the original layout and the correction length, and forming an updated layout, the method further comprises:

performing optical proximity correction (OPC) on the updated layout, and forming a corrected layout.

* * * * *